United States Patent
Reznik et al.

(10) Patent No.: US 6,910,569 B2
(45) Date of Patent: Jun. 28, 2005

(54) LOAD SINGULATION SYSTEM AND METHOD

(75) Inventors: Dan Reznik, Berkeley, CA (US); Michael Wynblatt, Pleasant Hill, CA (US)

(73) Assignee: Siemens Technology-To-Business Center, LLC, Berkeley, CA (US)

( * ) Notice: Subject to any disclaimer, the term of this patent is extended or adjusted under 35 U.S.C. 154(b) by 188 days.

(21) Appl. No.: 10/208,703

(22) Filed: Jul. 29, 2002

(65) Prior Publication Data

US 2003/0141165 A1 Jul. 31, 2003

Related U.S. Application Data

(60) Provisional application No. 60/353,083, filed on Jan. 29, 2002.

(51) Int. Cl.[7] .............................................. B65G 43/00
(52) U.S. Cl. ........................ 198/444; 700/218; 700/302
(58) Field of Search ................................ 198/434, 443, 198/444, 751, 769, 771; 700/215, 218, 225, 230, 302

(56) References Cited

U.S. PATENT DOCUMENTS

| | | |
|---|---|---|
| 3,604,551 A | 9/1971 | Fink |
| 3,617,033 A | 11/1971 | Ichikawa et al |
| 3,841,461 A | 10/1974 | Henderson et al. |
| 3,917,050 A | 11/1975 | Gregor |
| 4,000,492 A | 12/1976 | Willens |
| 4,039,074 A | 8/1977 | Maxted |
| 4,180,943 A | 1/1980 | Smith et al. |
| 4,634,328 A | 1/1987 | Carrell |
| 4,678,073 A * | 7/1987 | Anderson et al. ........... 198/444 |
| 4,944,381 A | 7/1990 | Riley |
| 5,147,023 A | 9/1992 | Meindl |
| 5,165,520 A | 11/1992 | Hervé et al. |
| 5,222,586 A | 6/1993 | Ydoate et al. |
| 5,299,693 A * | 4/1994 | Ubaldi et al. ................ 198/444 |
| 5,372,238 A | 12/1994 | Bonnet |
| 5,393,937 A | 2/1995 | Etherington et al. |
| 5,443,791 A | 8/1995 | Cathcart et al. |
| 5,529,756 A | 6/1996 | Brennan |
| 5,575,378 A * | 11/1996 | Billington et al. .......... 198/771 |

(Continued)

FOREIGN PATENT DOCUMENTS

| | | |
|---|---|---|
| DE | 31 39 279 A1 | 4/1983 |
| DE | 32 41 145 A1 | 5/1984 |
| EP | 0 463 878 A1 | 1/1992 |
| GB | 1 465 430 | 2/1977 |
| GB | 2 259 900 A | 3/1993 |
| WO | WO 00/76887 A1 | 12/2000 |

OTHER PUBLICATIONS

Dan Reznik and John Canny, "The Coulomb Pump: a Novel Parts Feeding Method using a Horizontally–Vibrating Surface" EECS Dept., UC–Berkeley, CA.

Jonathan E. Luntz, William Messner, and Howie Choset, "Parcel Manipulation and Dynamics with a Distributed Actuator Array: The Virtual Vehicle", Department of Mechanical Engineering, Carnegie Mellon University, Pittsburg, PA 15213.

*Primary Examiner*—Joseph Valenza

(57) ABSTRACT

A system and method for singulating loads are disclosed. The system includes a plurality of similarly configured load manipulation cells arranged to form an array. Each cell has a generally planar upper surface and an actuation system configured for operation independent of the actuation systems of the other cells. The system further includes a sensing system operable to identify the general location of loads positioned on the array and a controller configured to receive input from the sensing system and send commands to the actuation systems to singulate the loads positioned on the array. The controller is configured to process loads received in a continuous flow.

24 Claims, 14 Drawing Sheets

U.S. PATENT DOCUMENTS

| | | |
|---|---|---|
| 5,769,204 A | 6/1998 | Okada et al. |
| 6,027,694 A | 2/2000 | Boulton et al. |
| 6,189,677 B1 | 2/2001 | Ruf et al. |
| 6,250,707 B1 | 6/2001 | Dintner et al. |
| 6,259,967 B1 | 7/2001 | Hartlepp et al. |
| 6,264,891 B1 | 7/2001 | Heyneker et al. |
| 2002/0005333 A1 | 1/2002 | Mondie et al. |

* cited by examiner

LOAD SINGULATION SYSTEM AND METHOD

CROSS-REFERENCE TO RELATED APPLICATION

The present application claims priority from commonly owned U.S. provisional patent application No. 60/353,083 filed Jan. 29, 2002.

BACKGROUND OF THE INVENTION

The present invention relates generally to load singulation systems, and more particularly, to a load singulation system made up of an array of similarly configured cells each having an individually operable actuation system.

Load manipulation devices are used for moving and positioning loads such as parcels, cartons, packages, or industrial parts. These devices may be used, for example, by mail processors, package handlers, or manufacturers. Conventional load manipulation devices include conveyor belts and robotic manipulators. Conveyor belts are well suited for moving large objects over long distances but lack the ability to displace objects in multiple directions and to orient objects. Robotic manipulators are able to precisely position and orient objects but are limited by strength, reach, and the need for large unobstructed workspaces.

Programmable load manipulation by an array of actuators has been proposed to overcome some of these drawbacks. United Kingdom Patent Application No. 2,259,900 describes a hardware platform comprising a set of transfer stations juxtaposed to form a matrix. The matrix is composed of identical platforms of a regular shape (e.g., triangular, square). Each platform contains the appropriate load-motion hardware such as a roller, conveyor belts, and multi-directional (i.e., horizontally and vertically) vibrating surfaces. The disclosed systems have numerous disadvantages. For example, the required hardware for each platform is complex (e.g., multiple degrees of motion freedom is required) and expensive to build and maintain. The system's reliance on bearings reduces the expected operating life of the system, since bearings (sliding surfaces) wear easily under repetitive motion. Moreover, platforms based on a vibrating surface configuration requires simultaneous vertical and horizontal vibration which requires driving hardware to achieve vibration in two planes. In particular, driving a surface vertically requires an amount of energy which increases with the weight of the load.

Load manipulation with an actuator array is also disclosed in Parcel Manipulation and Dynamics with a Distributed Actuator Array: The Virtual Vehicle (J. E. Luntz, W. Messner, and H. Choset, Proc. IEEE Int. Conf. on Robotics and Automation (ICRA), pages 1541–1546, Albuquerque, N.Mex., April 1997) (hereinafter "Luntz et al."). Luntz et al. disclose an array of cells consisting of a pair of orthogonally oriented motorized roller wheels. Each wheel is driven through a gear reduction by a DC motor. The system requires expensive actuators with rotational speeds that must be accurately controlled electronically. Because rolling involves both static and sliding friction, it also introduces an added complexity of control in manipulating loads precisely. Another drawback of this system is that rollers do not pack together well, leaving large gaps between adjacent rollers, which can lead to jamming and the accumulation of loose particles inside the array.

One class of load manipulators are load singulation systems. Load singulation devices are used to arrange articles such as packages, into a single file so that the packages can be fed to a sorter machine, for example. Load singulation devices are generally categorized as open-loop or closed-loop devices.

Open-loop devices are configured for induction, accumulation, selective delivery, and recirculation of loads. The devices include actuators or obstacles that interact with loads under a specified arrangement. For example, U.S. Pat. No. 5,769,204 discloses a device operable to simultaneously push a forward-flowing stream of unsingulated packages against a sidewall to form a single file row of packages. Packages that are blocked from contact with the wall arrive at an input section spaced away from the wall. These packages are recirculated back to the device's input by a conveyor which attempts to force the packages back into the incoming flow. One drawback to these systems is the open-loop recirculation and reinsertion of packages. When the input flow is very dense, as is common in postal applications, for example, reinsertion by open-loop trial and error mechanisms is very inefficient. As a result, the recirculation buffer often overruns, resulting in system jams or failures. Another drawback is the removal of loads failing to connect with the singulating wall, which may result in a jam at the exit port. Constant human intervention is therefore required to keep the device up and running.

Closed-loop singulation devices are characterized by algorithmic driven load motion. The algorithm draws on real time data collected on the location and orientation of the loads. The singulation function is achieved by selective energization of components of a multi-actuator system. Closed-loop systems incorporate different types of sensing devices (e.g., laser beams, proximity sensors, imaging devices) and actuators (e.g., liver rollers, conveyor belts, actuated fences, pick-and-place actuation device). The systems include various recirculation, buffering, and transferring functions. U.S. Pat. No. 5,372,238 discloses an example of a closed-loop singulation system made up of a number of different modules. Each module contains several live-roller actuators and is selectively activated to induct, reorganize, store, recirculate, and transfer loads according to an instantaneous load arrangement. Closed loop devices such as this typically include a combination of different types of modules. A disadvantage of these systems is that they are mechanically heterogeneous (i.e., each module has a different configuration or is made up of different parts) and complex, with many independent moving parts and specialized modules. This results in high building costs, difficult maintenance, and complex performance analysis.

Other singulation systems lack the ability to process a continuous incoming load stream (i.e., the system can only operate on discrete batches of packages). Continuous operation is desirable when the incoming flow is very dense or fed at varying speeds, since continuous flow devices typically continue to singulate processed packages during input starvation.

SUMMARY OF THE INVENTION

A method and system for singulating loads are disclosed. A method of the present invention generally includes singulating loads on a system comprising a plurality of similarly configured load manipulation cells arranged to form an array and a feedback control system coupled to the cells and operable to control a continuous incoming flow of loads. Each cell is configured for independent operation. The method includes receiving one or more incoming loads along an incoming edge of the array and identifying a load positioned closest to an outgoing edge of the array. The load positioned closest to the outgoing edge of the array is moved towards the outgoing edge. The remaining incoming loads are moved toward the outgoing edge at a specified velocity. The load positioned closest to the outgoing edge of the array is moved at a velocity greater than the specified velocity.

A system of the present invention generally includes a plurality of similarly configured load manipulation cells arranged to form an array. Each cell has a generally planar upper surface and an actuation system configured for operation independent of the actuation systems of the other cells. The system further includes a sensing system operable to identify the general location of loads positioned on the array and a controller configured to receive input from the sensing system and send commands to the actuation systems to singulate the loads positioned on the array. The controller is configured to process loads received in a continuous flow.

The above is a brief description of some embodiments of the present invention. Other features, advantages, and embodiments of the invention will be apparent to those skilled in the art from the following description, drawings, and claims. Corresponding reference characters indicate corresponding parts throughout the several views of the drawings.

DETAILED DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
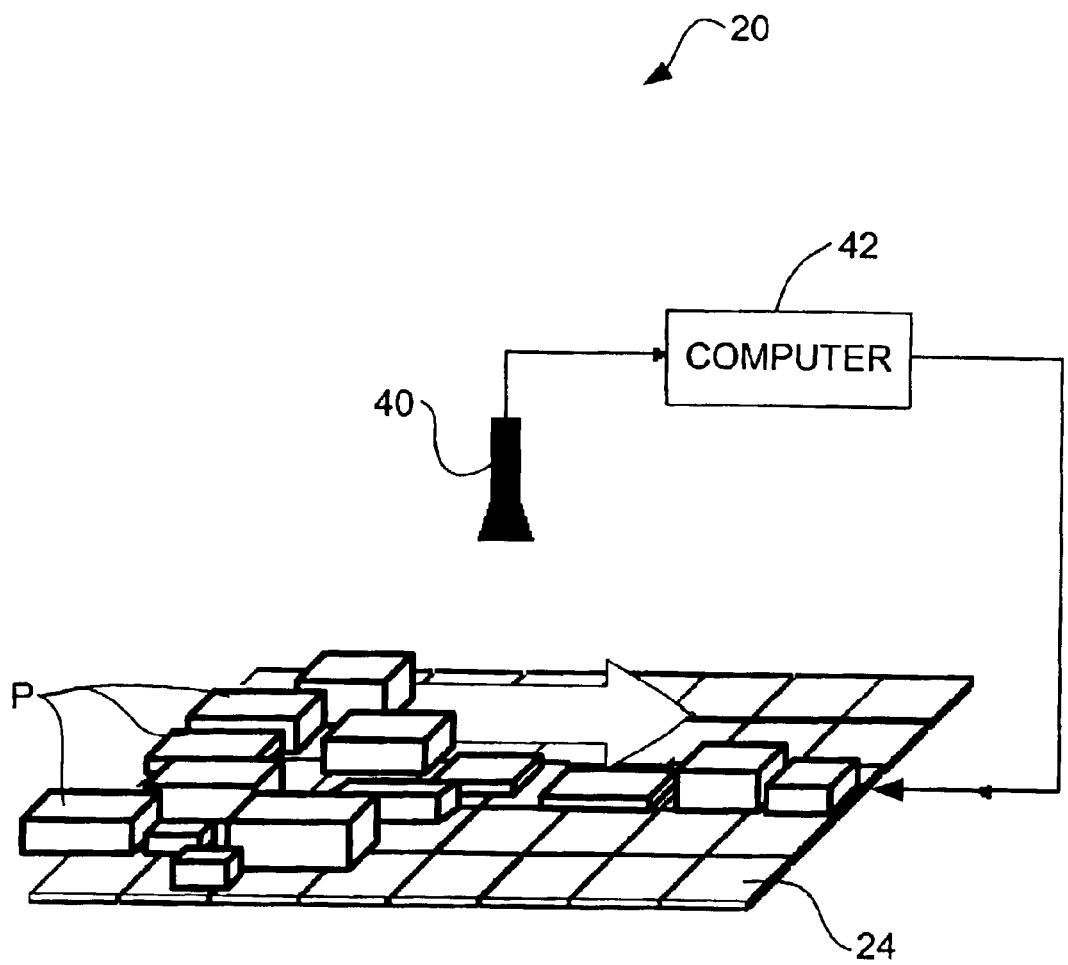
FIG. 1 is a schematic diagram of a load singulation system, according to a specific embodiment of the present invention.

Referring now to the drawings, and first to FIG. 1, a load singulation system of the present invention is shown and generally indicated at 20. The system provides manipulation (displacement along programmable directions) of loads P such as parcels, cartons, packages, or industrial parts, and more specifically the system is designed for load singulation. The system includes a matrix of cells having upper surfaces 24, a controller (computer) 42, and a sensory feedback device (camera) 40. The upper surfaces 24 of the cells are juxtaposed to form a load manipulation surface. The upper surface 24 is configured for supporting a load and horizontally vibrating to transfer the load from the upper surface of one cell to the upper surface of one or more adjacent cells. Each cell includes one or more actuators configured to move the upper surface 24. The number and size of the cells may vary depending on the application and size and type of loads the system is configured to singulate. The array may have a non-rectangular contour (e.g., wide at the incoming edge and narrow at the outgoing edge). Cell tops may be a shape other than square (e.g., rectangular, triangular), provided cells can be packed together to form an array. As described below, an incoming stream of loads is dynamically rearranged into a single-file exiting stream by speeding up the load nearest to the exit with respect to other incoming loads. The incoming loads are received at an incoming edge and moved towards an outgoing edge. As shown in FIG. 1, the incoming and outgoing edges are be parallel to one another, however, the edges may also be perpendicular to one another.

Figure 2:
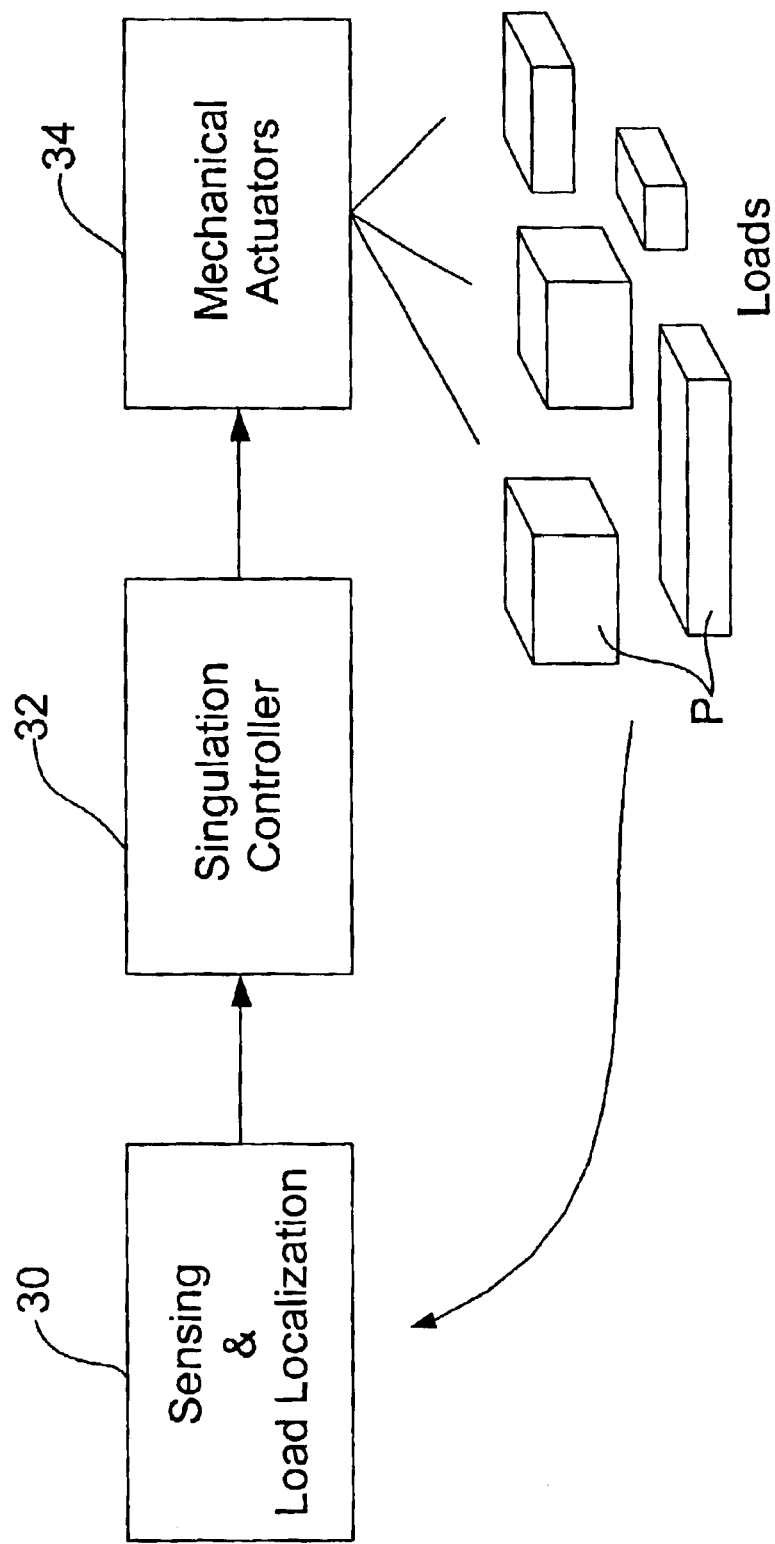
FIG. 2 is a block diagram of the load singulation system of FIG. 1.

A block diagram illustrating feedback and control of the load singulation system is shown in FIG. 2. A sensing and load localization module 30 sends information about positions of the loads P to a singulation controller 32 which sends commands to actuators 34. The actuators move the upper surfaces 24 and cause displacement of loads P positioned on the upper surfaces of the cells. The sensing module 30 may be an imaging device such as a camera, proximity sensors, or pressure sensitive transducers, for example.

Each cell receives both power and data commands from controlling computer 42. Each cell is preferably responsible for computer interfacing, self-calibration, and signal generation and amplification according to the desired data. In a preferred embodiment, each cell is hardwired with a unique number identifier and all cells receive data information from the same serial (or wireless) bus, such as RS485 (serial bus standard). The computer accesses an individual cell by broadcasting messages with a field, which identifies the intended actuator 34. The sensing module 30 includes a data interpreter which operates to determine the position of each load located within the load singulation system. The data interpreter includes computer vision software capable of distinguishing loads from one another, identifying the boundaries of loads, and identifying the position of loads. An example of a computer vision system that may be used is the MVS-800, available from Cognex Inc. It is to be understood that other type of data interpreters may be used without departing from the scope of the invention. The controller 32 includes a controller device and a singulation program. The controller includes, for example, a PC (Personal Computer), or embedded microprocessor.

In a preferred embodiment, the load positions are identified by an overhead imaging device (e.g., video camera) 40, whose frames are sent in real time to image-processing software installed on computer 42 (FIG. 1). The camera 40 and computer 42 are used to identify the location of each load positioned on the array of cells. Load contours are recovered using standard image processing algorithms, yielding traceable load position and orientation, as is well known by those skilled in the art. The computer 42 executes algorithms of image-acquisition, load localization, and load singulation.

Figure 3:
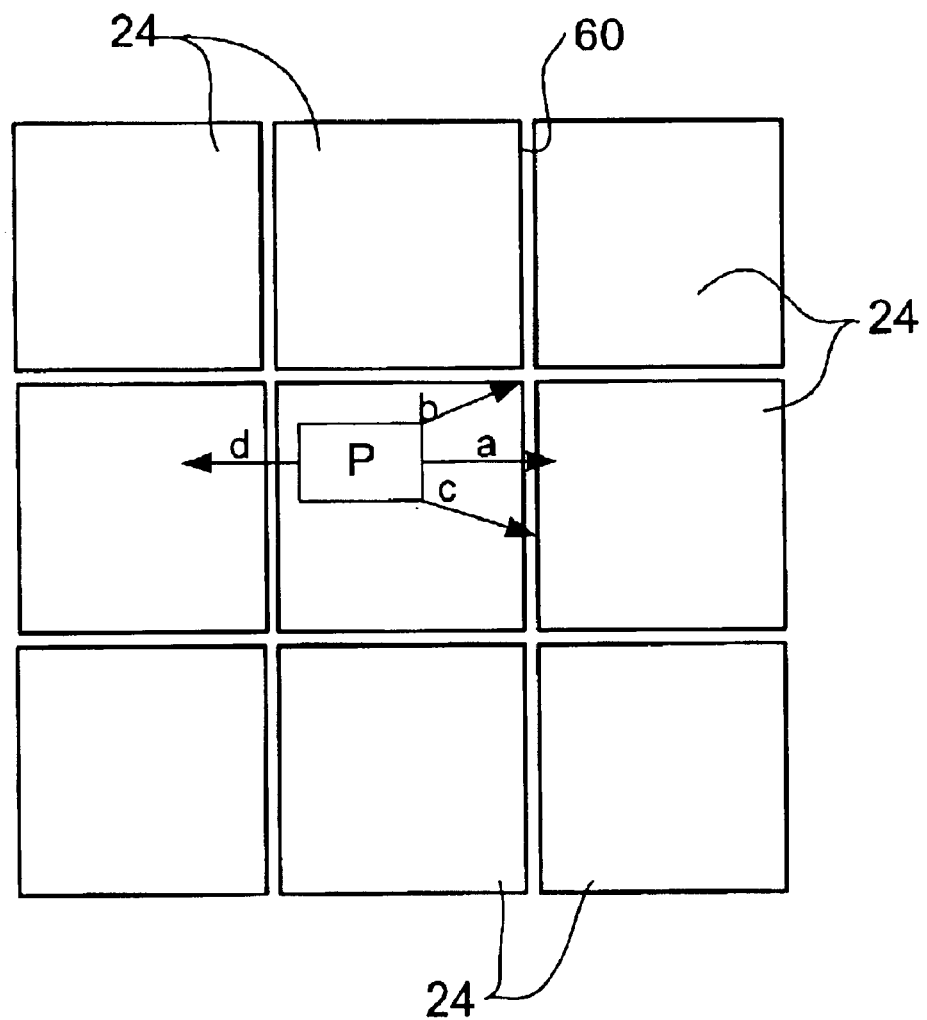
FIG. 3 is a top view of an array of load manipulation cells illustrating movement of a load over the array.

As shown in FIG. 3, each cell is operable to move a load in several directions at a selected speed. Preferably, each cell is configured to move a resident load P (i.e., load positioned on top of a cell) according to three trajectories: forward at 0° (arrow a), forward at 45° (arrow b), and forward at −45° (arrow c). It is noted that the 45° angle used for forward movement is preferred, but other specific embodiments may use other angles such as, for example, 30° or 60°. In a preferred embodiment, the cell can also move the load backward at about 180° (arrow d), and optionally rotate a load about its center. It is also noted that the 180° angle used for backward movement is preferred, but other specific embodiments may use other angles such as, for example, 200° or 160°. As further described below, each cell can move a resident load along any one of these trajectories with varying velocity. The range of velocity that is supported depends on the induction capacity of incoming loads. For example, if N new loads can enter the singulation system simultaneously, the cells are configured to support velocities V and at least N*V (this prevents loads from accumulating in the device and backing up the incoming flow).

Figure 4A:
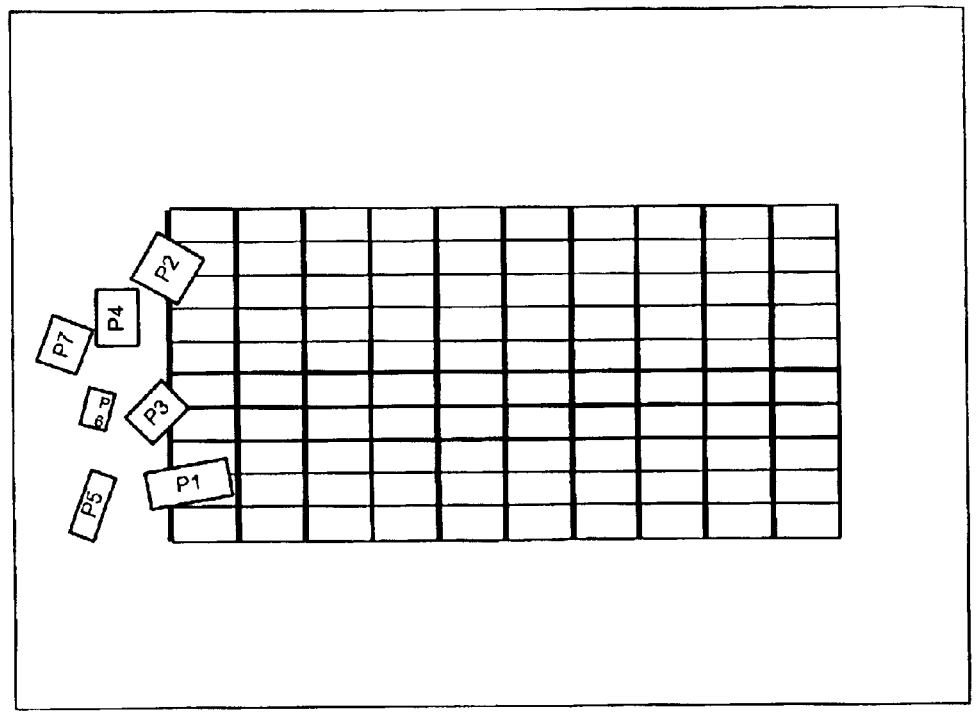
FIGS. 4A, 4B, 4C, 4D, 4E, and 4F show sequential top views illustrating load movement during a singulation operation.
Figure 4B:
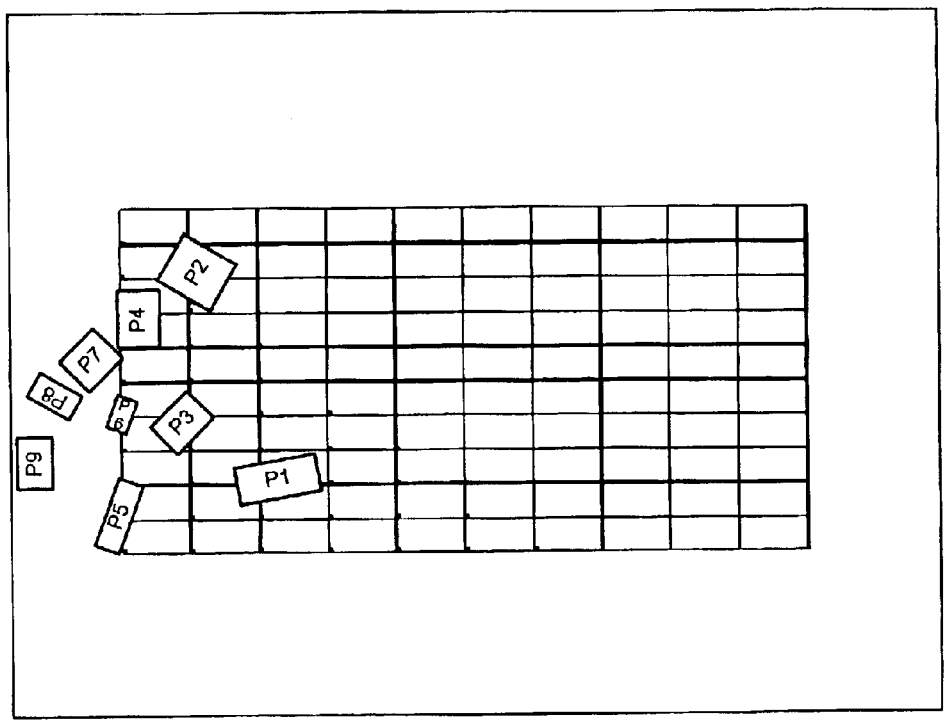
Figure 4C:
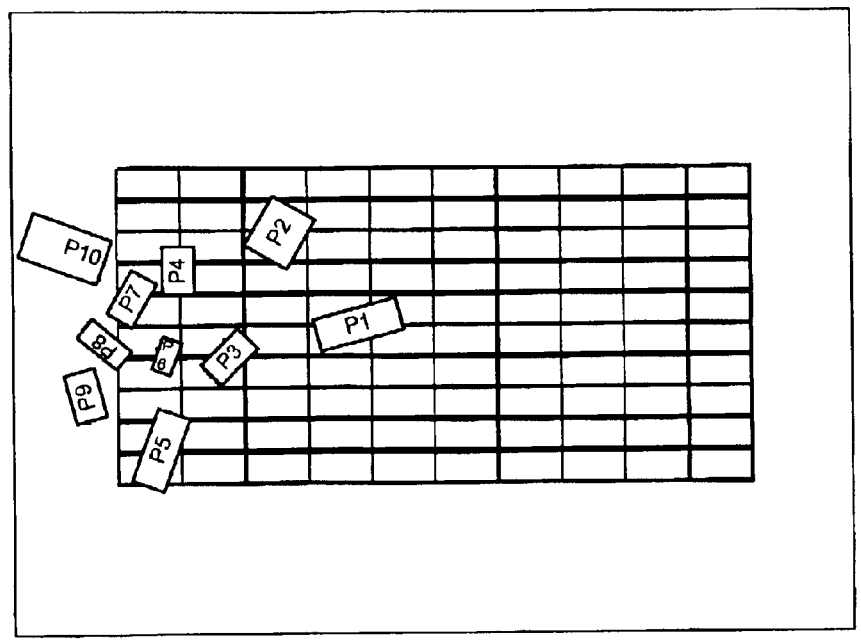
Figure 4D:
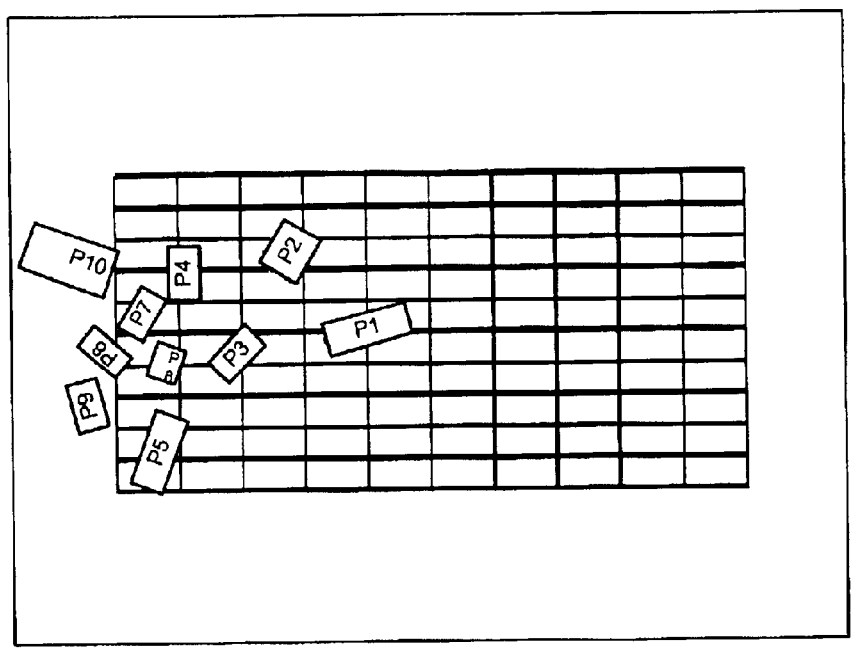
Figure 4E:
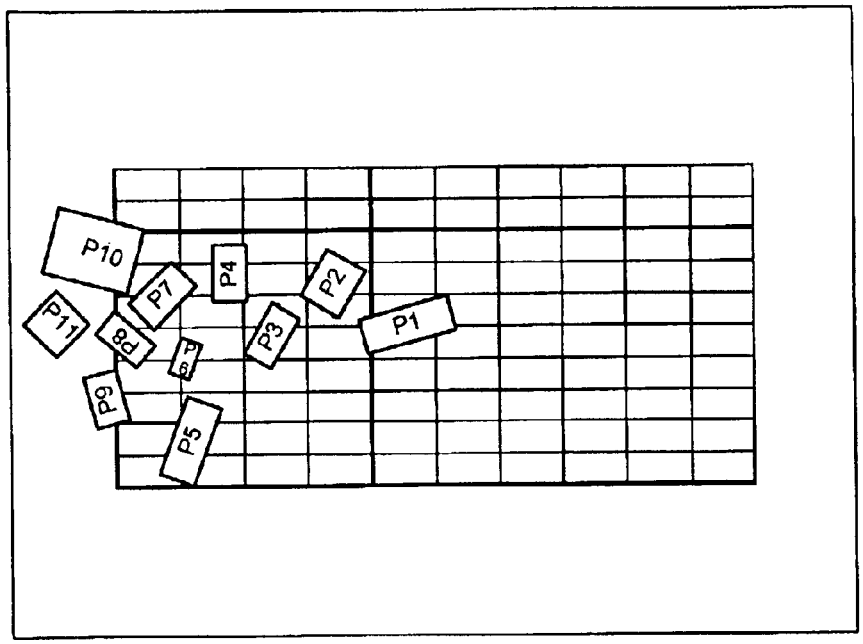
Figure 4F:
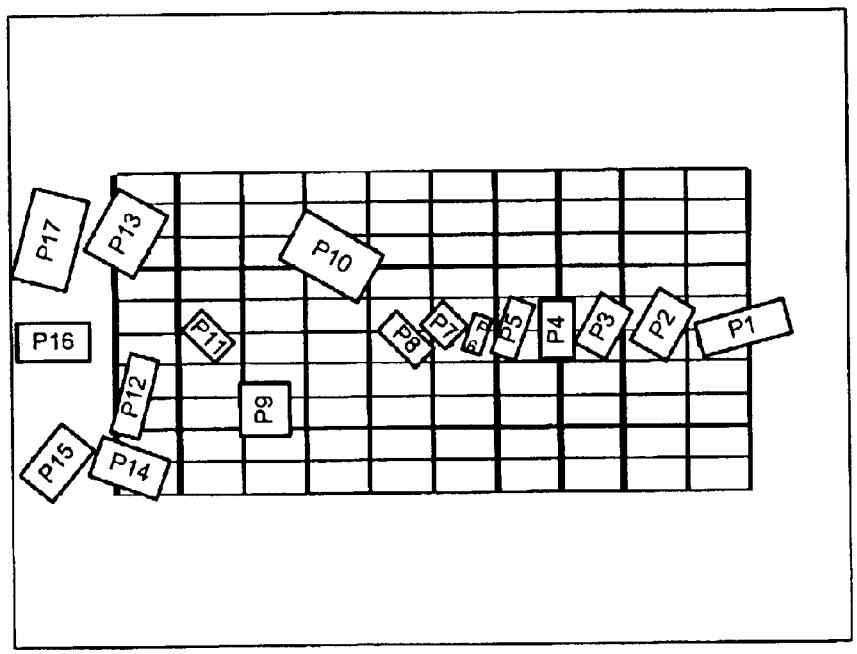

FIGS. 4A, 4B, 4C, 4D, 4E, and 4F show sequential positions of loads located on the load manipulation surface of the load singulation system and illustrate an example of how load positions change over a typical singulation operation. The actuators 34 (indicated by the rectangular boxes) move the loads to the right to form a single line of packages. As the loads move, the controller 32 uses the sensor 30 to detect the current position of each load (FIG. 2). The controller 32 then adjusts the force applied by each actuator, which in turn causes each load to move with varying speeds and trajectories according to a particular pattern. As shown in FIGS. 4A–4F, the controller 32 may be configured, for example, to move the load furthest to the right (P1) forward faster than the other loads until it has cleared the second rightmost load (P2) and then move the load toward the center. This results in the loads exiting the system in a single-file line (FIG. 4F).

During the singulation process, the controller 32 assigns a unique ID (P1–P17 as shown in FIGS. 4A–4F) to each load and keeps track of the IDs by arranging them in sets. The first set is referred to as the entered set and represents unsingulated loads (e.g., load P1 in FIG. 4A, loads P2, P3, P4 in FIG. 4B, loads P3, P4, P5, P6, P7 in FIGS. 4C and 4D, loads P5, P6, P7, P8 in FIG. 4E, loads P9, P10, P11, P12, P13, P14 in FIG. 4F). The second set is referred to as the singulated set and represents loads that have an unobstructed path of motion parallel to the edges of the singulator towards the outgoing edge (e.g., load P1 in FIG. 4B, loads P1, P2 in 4C, loads P1, P2 in FIG. 4D, loads P1, P2, P3, P4 in FIG. 4E). The third set of loads is referred to as an aligned set and represents loads that have already been positioned to form a single file line (e.g., load P1 in FIGS. 4C, 4D, and 4E, loads P1, P2, P3, P4, P5, P6, P7, P8 in FIG. 4F). Within each entered set there is a load identified as the rightmost load (P1 in FIG. 4A, P2 in FIG. 4B, P3 in FIG. 4C, P4 in FIG. 4D, P5, in FIG. 4E, P10 in FIG. 4F). This load is moved to the right at the same velocity as the aligned and singulated loads. This load is added to the singulated set, once it has moved a sufficient distance to the right to clear the next closest load so that it has an open path to move into the aligned set.

Figure 5:
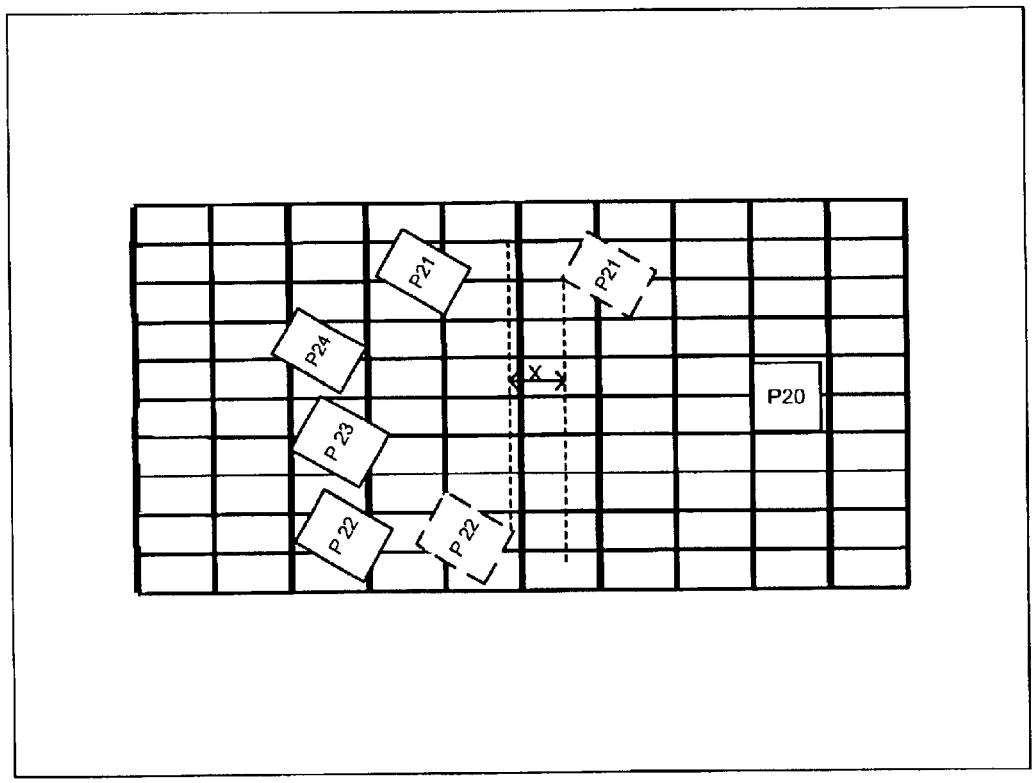
FIG. 5 is a top view illustrating extraction of a package from a group of packages for singulation.
Figure 6:
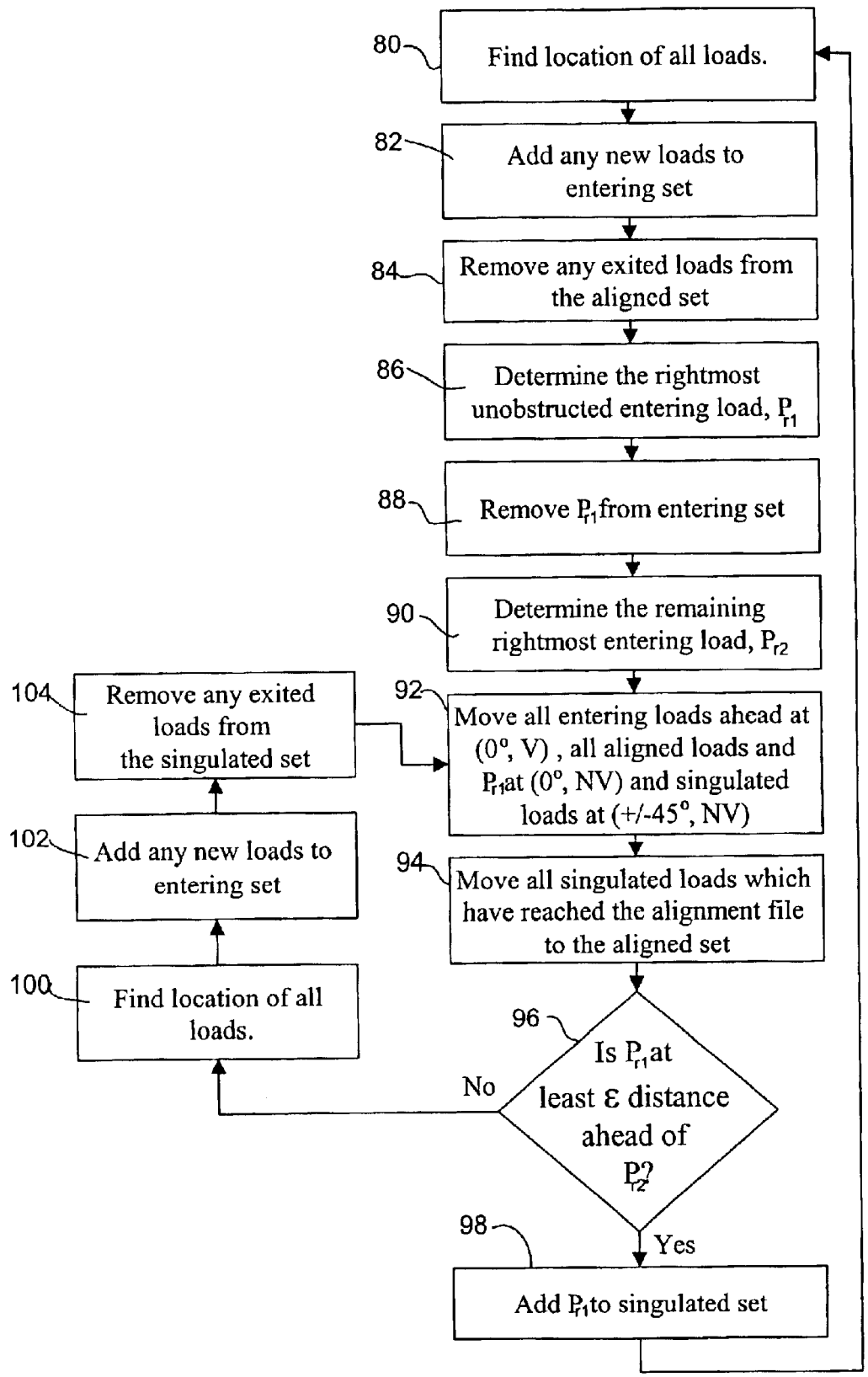
FIG. 6 is a flowchart illustrating a singulation process, according to a specific embodiment.

FIG. 5 is a schematic illustrating movement of loads during a singulation process, and FIG. 6 is a flowchart illustrating a singulation process of the present invention. In FIG. 5, load P20 is in the aligned set and P21, P22, P23, P24 are in the entered set. The location of loads is first identified by the sensor 30 and the data interpreter reports the locations and boundaries of all loads (step 80, FIG. 6). Any previously unknown loads which have entered the singulator system are assigned IDs by the controller and the IDs are added to the entered set (step 82). Any loads which are no longer present (due to exiting the singulator system) are removed from the aligned set (step 84). The rightmost unobstructed member ($P_{r1}$) of the entered set (in FIG. 5 the rightmost unobstructed member is load P21) is then identified (step 86). The load is selected by determining the rightmost vertex of each load, ranking the loads by rightmost vertex, and checking each load, starting from the highest rank, until one is found for which the path to the right is unobstructed by other loads in the entered set. The first such load found is removed from the entered set and designated $P_{r1}$ (step 88).

This process is then repeated to determine the rightmost member ($P_{r2}$) from the remaining members of the entered set (step 90). In FIG. 5, $P_{r2}$ is load P22. All loads are then moved at step 92. Loads in the entered set (P22, P23, P24) are moved to the right at 0° with velocity V. Load $P_{r1}$ (P21) and loads in the aligned set (P20) are moved right at trajectory 0° with velocity of at least N*V (where N is the maximum number of new loads which can enter the singulation system at any time simultaneously—this is a function of the maximum load radius and the width of the incoming edge). Loads in the singulated set are moved to the right at velocity of at least N*V at +/−45° (depending on which direction is appropriate to move the singulated set to the aligned field). It is noted that the 45° angle used for the movement is preferred, but other specific embodiments may use other angles such as, for example, 30° or 60°. The members of the singulated set are checked to determine if their center point is aligned with the aligned field. If the loads are aligned, they are removed from the singulated set and added to the aligned set (step 94).

After the loads have been moved, the leftmost vertex of $P_{r1}$ (P21) is compared to the rightmost vertex of $P_{r2}$ (P22) (step 96). If $P_{r1} > P_{r2} + \epsilon$ (where $\epsilon$ is a tolerance value), then $P_{r1}$ is considered singulated, $P_{r1}$ is added to the singulated set, and the next appropriate $P_{r1}$ is identified (steps 96 and 98). If $P_{r1} \leq P_{r2} + \epsilon$, the system updates its records with information received from the sensors 30 and continues with the current $P_{r1}$ (steps 96, 100, 102, and 104). In FIG. 5, P21 and P22 are shown in phantom after the loads have been moved. The leftmost vertex of P21 is farther to the right than the rightmost vertex of P22 (as indicated by distance x in FIG. 5). Therefore, P21 is added to the singulated set. P22 is then identified as the next $P_{r1}$ and the process continues.

In a preferred embodiment of the invention, efficiency may be enhanced as follows. During intervals in which no new loads are inducted, the leftmost load L is moved at trajectory of 180° and velocity V, until the rightmost vertex of L is $\epsilon$ units left of the leftmost vertex of the other loads in the entered set. If this condition is reached, and still no new loads have been inducted, the next leftmost load is selected and the process continues in a mirror to the above described process. Namely, the selected load's speed is reduced with respect to the other incoming loads. This has the effect of simultaneously singulating loads on the leading and trailing edge of the entered set, effectively doubling the capacity for this period. In continuous flow operation, this adds value during starvation of the incoming flow.

Figure 7:
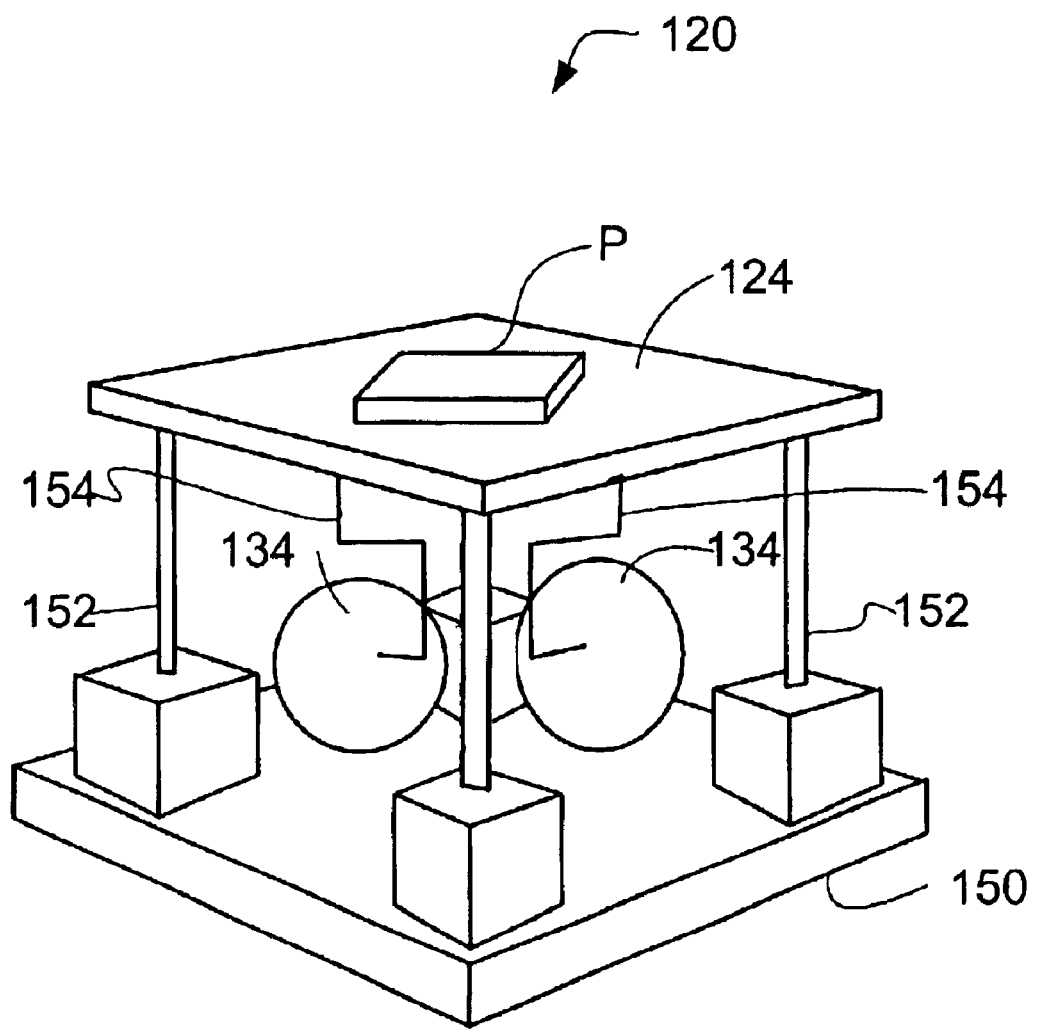
FIG. 7 is a schematic of one embodiment of a cell of the load singulation system of the present invention.

FIG. 7 illustrates one example of a cell 120 that may be used to form the load singulation system 20. The cell is disclosed in U.S. patent application Ser. No. 10/207,680, entitled Load Manipulation System, concurrently filed herewith, by Dan Reznik et al., which is incorporated herein by reference in its entirety. Each cell 120 includes upper vibrating surface 124 configured to support and move load P, support base 150, four flexible legs 152 interposed between the support base and the upper surface, two actuators 134, and two transmissions 154 coupling the actuators to the upper surface. It is to be understood that the number of actuators 134 used to move the upper surface 124 in each cell 120 may be different than shown herein. For example, only one actuator 134 may be used or more than two actuators may be used as described below.

The support base 150 is preferably similar in size and shape to the upper surface 124 so that the cells 120 may be positioned adjacent to one another with only a small gap 60 therebetween (e.g., 5–10 mm) (FIGS. 3 and 7). A compressible material, such as rubber, may be placed in the gaps 60 so that the overall system is generally planar and sealed to prevent loose particles from otherwise falling inside the actuator volume. The base 150 may be formed from a material such as a medium density fiber wood, for example. The flexible legs 152 may be formed from a material such as nylon rods which provide sufficient flexure to allow for in-plane, horizontal vibratory movement of the upper surface 124. The upper surface 124 is generally planar and formed from a rigid, lightweight material such as honeycomb panels. The upper surface 124 is preferably rectangular but may also be in the form of other shapes that are configured for positioning adjacent to one another or an interlocking type of arrangement, for example. The actuator 134 and transmission 154 are contained within the space between the upper surface 124 and base 150 so that the cells 120 may be positioned adjacent one another. The outer contour of the array of cells may be in a shape other than a rectangular array.

The actuator 134 is preferably a current-to-force transducer. In a preferred embodiment, the actuators 134 are subwoofer speakers or other voice-coil type actuators, such as a commercially available Audiobahn AW800X subwoofer. The actuators 134 may also be pneumatic pistons or solenoids or linear motors or revolute motors adapted to a cam, designed to convert rotation to the desired linear motion.

Figure 8:
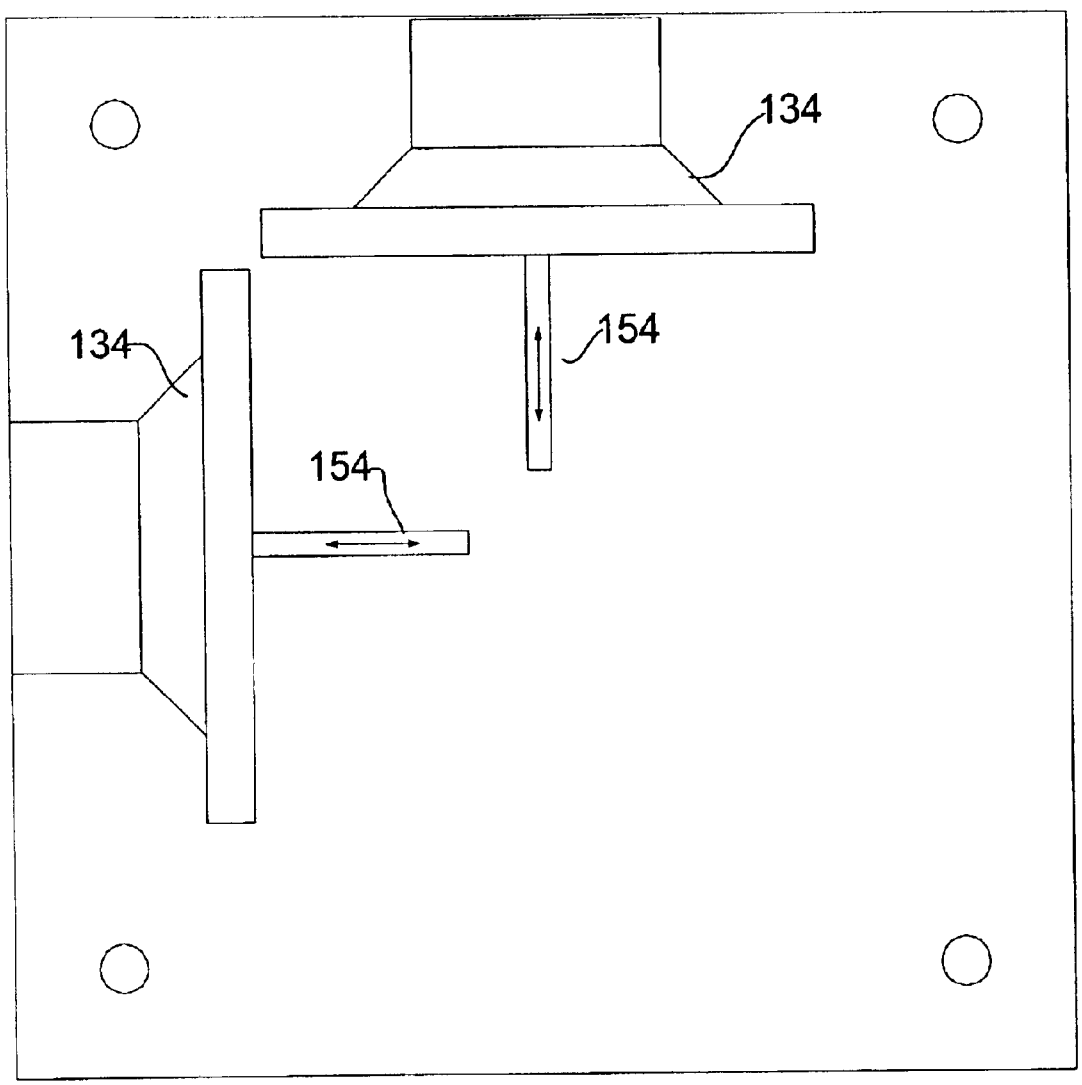
FIG. 8 is a top view of the cell of FIG. 7 with an upper vibrating surface removed to show detail.
Figure 9:
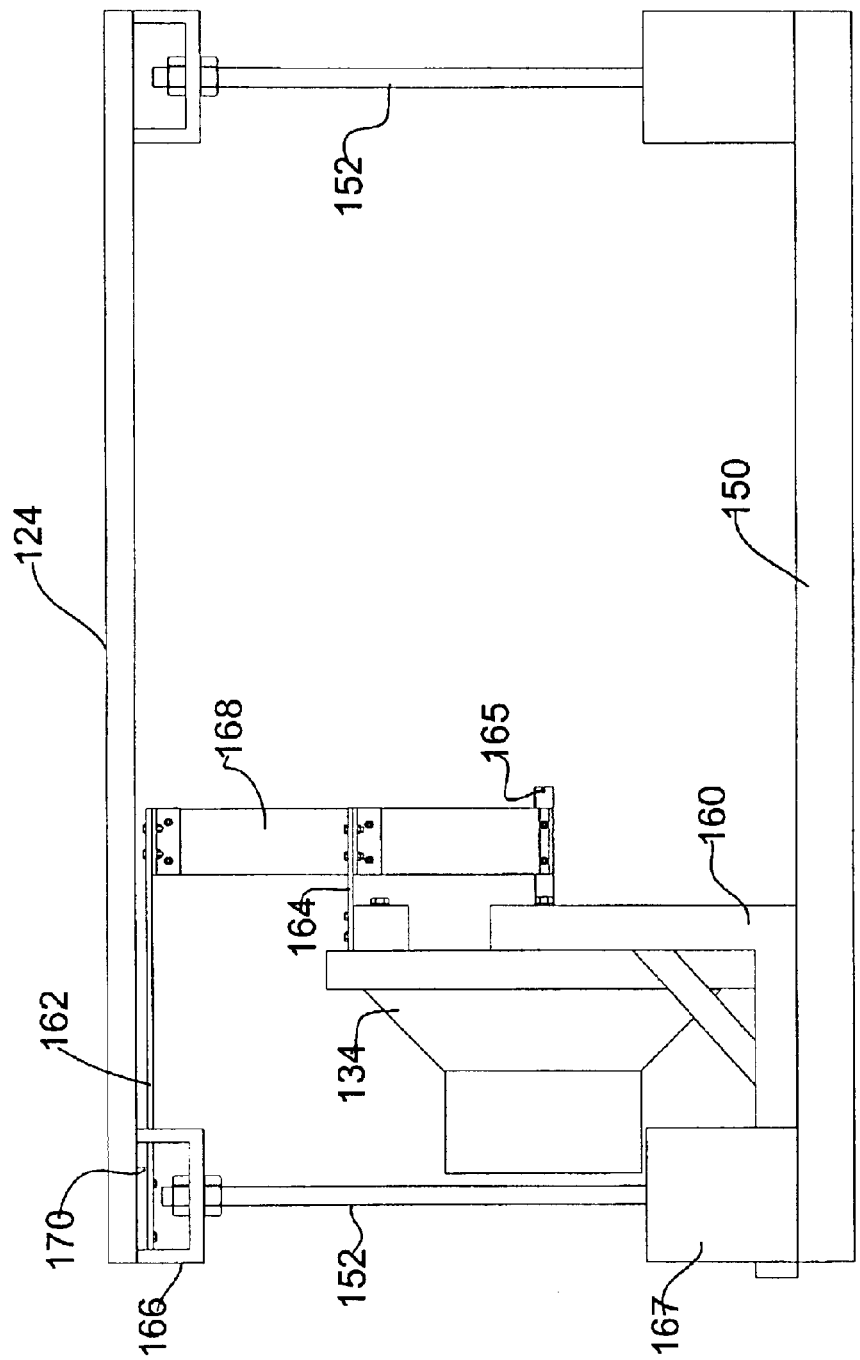
FIG. 9 is a side view of the cell of FIG. 7 with one actuator removed.
Figure 10:
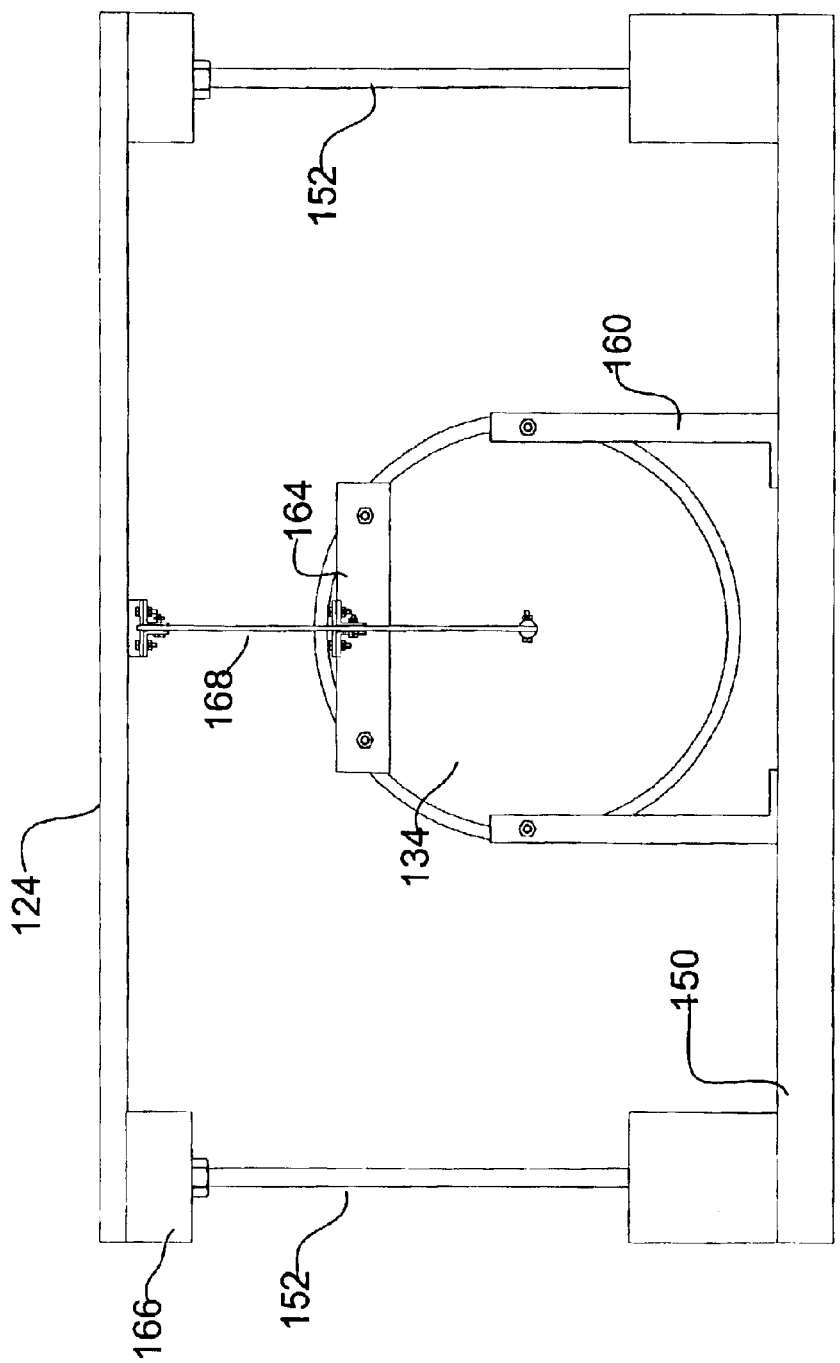
FIG. 10 is a front view of the cell of FIG. 9.

Additional details of cell 120 are shown in FIGS. 8, 9, and 10. FIG. 8 is a top view of the cell of FIG. 7 with the upper vibrating surface 124 removed to show detail. FIGS. 9 and 10 are side and front views of the cell, respectively, with one actuator 134 removed. The actuators 134 are mounted upright in the open space between the upper vibrating surface 124 and the support base 150 with rigid supports 160. Actuator (speaker) motion is transmitted to the upper surface 124 via a flexural transmission 154 which converts mid-level horizontal cone force to a symmetric force applied to the upper vibrating surface 124. Transmission 154 includes a stiff vertical beam 168 which pivots about a point on bar 164 through the bending of a small flexible strip of metal 165 (FIG. 9). Vertical beam 168 is coupled to horizontal beam 162 which transmits force to the upper surface 124. The horizontal beam 162 is attached to a pad 170 connected to the upper surface 124 along a periphery edge thereof.

The flexible legs 152 are each attached at one end to a coupling 166 which is connected to the upper surface 124. The other end of the leg 152 is mounted in a block 167 which is attached to the base 150. It is to be understood that the method of attachment of the legs 152 or the transmission 154 to the upper vibrating surface 124 may be different than shown and described herein without departing from the scope of the invention. For example, force may be transmitted directly to the upper surfaces by tilting each transducer up towards the surface, thus eliminating the pivoting flexure.

As shown in FIG. 8, one of the actuators 134 is positioned to provide force to move the upper surface 124 along an X axis located in the load manipulation plane and the other actuator is positioned to provide force to move the upper surface along a Y axis also located within the load manipulation plane.

Figure 11:
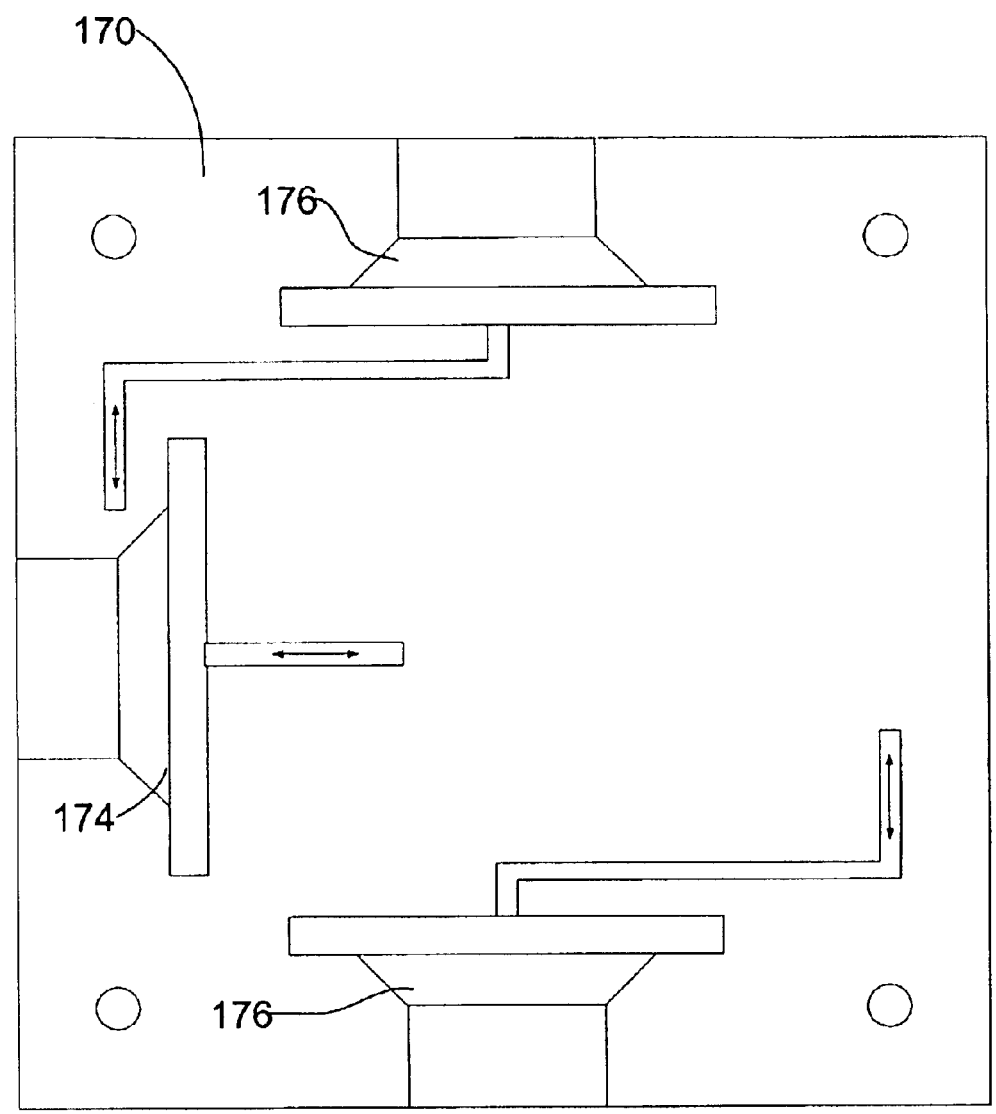
FIG. 11 is a top view of a second embodiment of the cell of FIG. 7 configured for load rotation.

FIG. 11 is a top view of a second embodiment of a cell 170 of the system of the present invention. The cell 170 includes three actuators; actuator 174 provides forces along an X axis and actuators 176 provide a combination of force along a Y axis and torque about a Z axis so that the loads can be rotated. The X and Y axes are located within the load manipulation plane.

In a preferred embodiment, each speaker is excited by an input current i(t) of the form:

$$i(t) = A[\sin(2\omega t) - \sin(\omega t)]$$

where:
  i: input current (amps)
  t: time (sec)
  A: amplitude (amps)
  $\omega$: frequency ($\omega = 2\pi f$ where f is specified in Hz).
Preferably, the speaker's cone moves back and forth with force proportional to i(t) (there are non-linearities which are corrected through self-calibration). This motion is transmitted to the upper vibrating surface 124 via transmission 154, whose steady state velocity is the time integral of i(t)=A[sin(2$\omega$t)−sin($\omega$t)]:

$$v(t) = \int i(t)dt = \frac{A}{\omega}\left[\cos(\omega t) - \frac{1}{2}\cos(2\omega t)\right]$$

Figure 12:
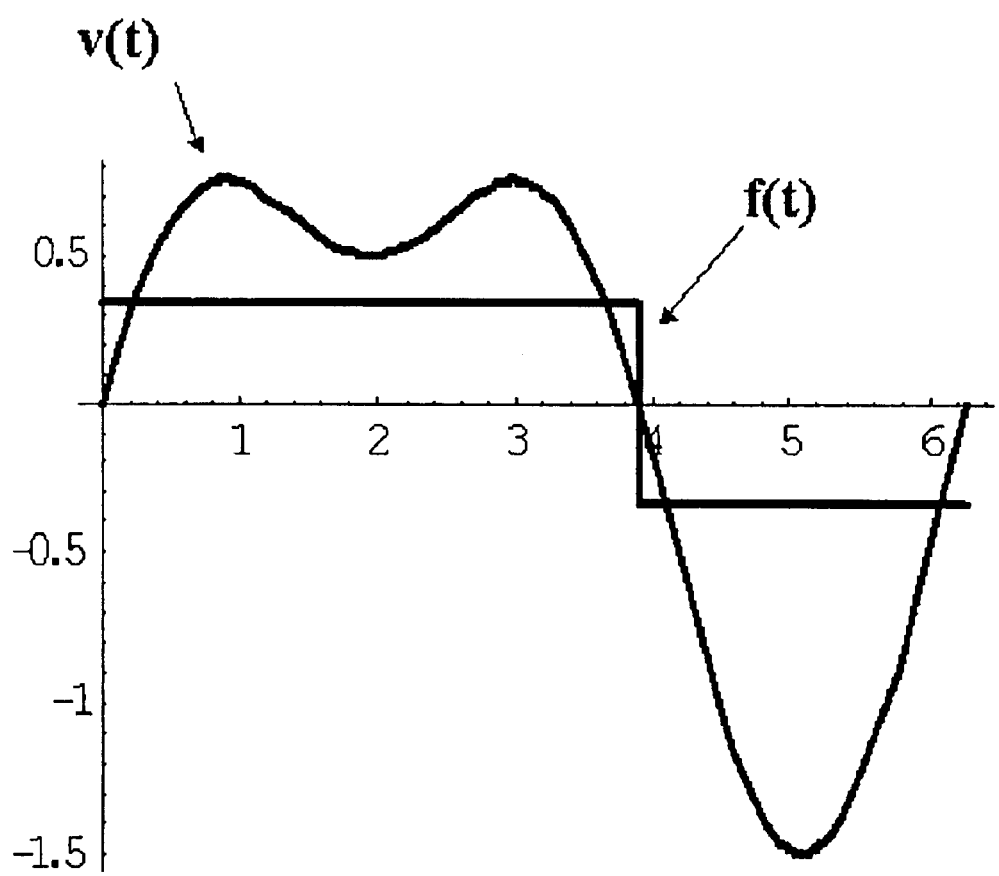
FIG. 12 is a graph illustrating a velocity profile of an actuator of the cell of FIG. 7 and instantaneous sliding friction force applied to a load by the actuator.

This waveform is shown in FIG. 12 which illustrates a velocity profile v(t) of a horizontal actuator that yields the highest load displacement velocity possible for an input drive composed of two sinusoids. FIG. 12 also includes a profile f(t) illustrating instantaneous sliding friction force applied to a supported load. Under the motion v(t), the upper surface 124 displaces supported loads P through sliding friction at a stable velocity V=A/2$\omega$. Achievable velocities typically range from 0 to 50 cm/s. See, D. Reznik, J. Canny, "The Coulomb Pump: A Novel Parts Feeding Method using a Horizontally-Vibrating Surface", 1998 IEEE Int. Conf. on Rob. & Autom. (ICRA), Leuven, Belgium, April 1998, which is incorporated herein by reference in its entirety.

At a given frequency $\omega$, the maximum horizontal displacement of upper vibrating surface 124 is roughly A/$\omega$^2, which under typical operation is of about 5 to 10 mm.

In the first embodiment shown in FIG. 8, one or more loads are translated in tandem over an actuator's surface along an arbitrary direction and with a speed out of a realizable range. Two speakers are installed in perpendicular orientation. One speaker drives the top plate along the X axis and the other along the Y axis. Each speaker receives an amplified signal as in i(t)=A[sin(2$\omega$t)−sin($\omega$t)], with individual amplitudes A1 and A2. The ratio A1/A2 defines in which direction a supported load will flow and with which speed. In the second embodiment shown in FIG. 11, one or more loads can be both translated and rotated over a single actuator. The three speakers are installed in perpendicular orientations. Speaker 174 drives upper surface 124 along the X axis and speakers 176 drive the surface along the Y axis and differentially about the Z axis (i.e., they can inject a torque) using off-center flexures.

It is to be understood that the load manipulation cell shown in FIGS. 7–11 and described above is only one example of a cell that may be used and that different cell designs may be used without departing from the scope of the invention. Each cell is preferably capable of displacing one or more loads along a programmable direction and at a programmable speed. Other examples of actuation technologies that may be used in the cell include live rollers, cross conveyor belts, and tiles that vibrate vertically and horizontally simultaneously.

Although the present invention has been described in accordance with the embodiments shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for singulating loads on a system comprising a plurality of similarly configured load manipulation cells arranged to form an array, each cell configured for independent operation, and a feedback control system coupled to the cells and operable to control a continuous incoming flow of loads, the method comprising:

receiving one or more incoming loads along an incoming edge of the array;

identifying a load positioned closest to an outgoing edge of the array;

moving the load positioned closest to the outgoing edge of the array towards the outgoing edge;

moving the remaining incoming loads towards the outgoing edge at a specified velocity, wherein the load positioned closest to the outgoing edge of the array is moved at a velocity greater than the specified velocity; and moving the received loads towards an aligned field of the array such that the loads generally form a single line.

2. The method of claim 1 wherein the load positioned closest to the outgoing edge is moved at a velocity generally equal to the specified velocity times the number of incoming loads.

3. The method of claim 1 further comprising after moving the incoming loads, comparing the load positioned closest to the outgoing edge of the array with the next closest load to determine if it is a sufficient distance away from the load to move to an aligned field of the array without contacting the next closest load.

4. A method for singulating loads on a system comprising a plurality of similarly configured load manipulation cells arranged to form an array, each cell configured for independent operation, and a feedback control system coupled to the cells and operable to control a continuous incoming flow of loads, the method comprising:

receiving one or more incoming loads along an incoming edge of the array;

identifying a load positioned closest to an outgoing edge of the array;

moving the load positioned closest to the outgoing edge of the array towards the outgoing edge;

moving the remaining incoming loads towards the outgoing edge at a specified velocity;

after moving the incoming loads, comparing the load positioned closest to the outgoing edge of the array with the next closest load to determine if it is a sufficient distance away from the load to move to an aligned field of the array without contacting the next closest load; and moving the load positioned closest to the outgoing edge at an angle towards the aligned field if it is a sufficient distance away from the next closest load;

wherein the load positioned closest to the outgoing edge of the array is moved at a velocity greater than the specified velocity.

5. The method of claim 4 wherein the load positioned closest to the outgoing edge is moved at an angle of approximately 45 degrees relative to the outgoing edge.

6. The method of claim 4 wherein at least one load positioned closest to the incoming edge and unobstructed with respect thereto is moved slower than the other loads being processed.

7. The method of claim 1 wherein one or more aligned loads are disposed on the array in the aligned field and further comprising moving the aligned loads towards the outgoing edge at generally the same velocity as the incoming load closest to the outgoing edge.

8. The method of claim 1 wherein the array is generally rectangular as viewed from above and the incoming edge and outgoing edge are generally parallel to one another and further comprising moving the incoming loads towards the outgoing edge in a direction generally perpendicular to the edge.

9. The method of claim 1 further comprising assigning a unique ID to each of the incoming loads.

10. The method of claim 1 wherein identifying a load positioned closest to an outgoing edge of the array comprises sensing the load with an imaging device.

11. The method of claim 10 further comprising interpreting data provided by the imaging device to determine the position of each load positioned on the array.

12. The method of claim 1 wherein each of the cells is configured to move the loads in a direction generally perpendicular to the outgoing edge.

13. The method of claim 12 wherein each of the cells is further configured to move the loads in a direction away from the outgoing edge.

14. The method of claim 12 wherein each of the cells is configured to move the loads at an angle of about 45 degrees relative to the outgoing edge.

15. The method of claim 1 wherein the load manipulation cells each include a generally planar upper surface for supporting the loads, the upper surfaces of the cells forming a load manipulation surface.

16. The method of claim 15 wherein moving the loads comprises moving the loads in a plane of the load manipulation surface.

17. The method of claim 15 wherein moving the loads comprises horizontally vibrating the upper surfaces of the load manipulation cells.

18. A load singulation system comprising:

a plurality of similarly configured load manipulation cells arranged to form an array, each cell comprising a generally planar upper surface and an actuation system configured for operation independent of the actuation systems of the other cells;

a sensing system operable to identify the general location of loads positioned on the array; and a controller configured to receive input from the sensing system and send commands to the actuation systems to singulate the loads positioned on the array, wherein the controller is configured to align the loads generally in a single line and move the aligned loads towards a common outgoing edge to process the received loads in a continuous flow.

19. The system of claim 18 wherein the sensing system comprises a camera and an imaging processing system.

20. The system of claim 18 wherein the upper surfaces of the cells are arranged to form a generally planar load manipulation surface.

21. The system of claim 20 wherein the actuation systems are operable to vibrate the upper surface of the cell only within a horizontal plane of the load manipulation surface.

22. The system of claim 21 wherein the actuation system comprises at least one current-to-force transducer.

23. The system of claim 20 wherein the actuation system comprises two actuators configured to drive the upper vibrating surface along two perpendicular axes located within the plane of the load manipulation surface.

24. The system of claim 18 wherein the cells are positioned generally adjacent to one another.

* * * * *